(12) United States Patent
Mehra et al.

(10) Patent No.: US 9,069,468 B2
(45) Date of Patent: Jun. 30, 2015

(54) POOLED PARTITION LAYOUT AND REPRESENTATION

(75) Inventors: Karan Mehra, Sammamish, WA (US); Emanuel Paleologu, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 82 days.

(21) Appl. No.: 13/229,734

(22) Filed: Sep. 11, 2011

(65) Prior Publication Data

US 2013/0067191 A1    Mar. 14, 2013

(51) Int. Cl.
*G06F 9/50* (2006.01)
*G06F 3/06* (2006.01)

(52) U.S. Cl.
CPC ............ *G06F 3/0605* (2013.01); *G06F 9/5061* (2013.01); *G06F 3/0644* (2013.01); *G06F 3/0689* (2013.01)

(58) Field of Classification Search
CPC .............................. G06F 3/0644; G06F 9/5061
USPC ................................................. 711/173, 114
See application file for complete search history.

(56) References Cited

U.S. PATENT DOCUMENTS

| | | | |
|---|---|---|---|
| 5,721,858 A | 2/1998 | White et al. | |
| 6,470,423 B1 | 10/2002 | Ho et al. | |
| 7,260,681 B2 | 8/2007 | Lubbers | |
| 7,349,908 B2 | 3/2008 | Shyam et al. | |
| 7,395,402 B2 | 7/2008 | Wilson et al. | |
| 7,885,921 B2 | 2/2011 | Mahar et al. | |
| 7,937,551 B2 | 5/2011 | Schott | |
| 2004/0172501 A1 | 9/2004 | Ukai et al. | |
| 2005/0235337 A1* | 10/2005 | Wilson et al. | ................. 725/134 |
| 2008/0229048 A1 | 9/2008 | Murase et al. | |
| 2010/0306467 A1* | 12/2010 | Pruthi et al. | ................. 711/114 |

(Continued)

FOREIGN PATENT DOCUMENTS

| | | |
|---|---|---|
| CN | 101893999 A | 11/2010 |
| CN | 101916173 A | 12/2010 |

(Continued)

OTHER PUBLICATIONS

"International Search Report", Mailed Date: Sep. 25, 2012, Application No. PCT/US2011/055581, Filed Date: Oct. 10, 2011, pp. 9.

(Continued)

*Primary Examiner* — Than Nguyen
(74) *Attorney, Agent, or Firm* — John Jardine; Kate Drakos; Micky Minhas

(57) ABSTRACT

A set of storage devices may interoperate to share a pool of storage space, such as in a Redundant Array of Inexpensive Disks (RAID) scheme. However, the details of the representation of the pool and the allocation of capacity to the pool may enable advantages and/or impose limitations on the storage set. Presented herein are techniques for generating a representing a pooled partition on one or more storage devices featuring a pool configuration representing the pool as a set of spaces manifested by the pool; a set of storage devices sharing the pool; and a set of extents that map physical areas of the storage devices to logical areas of the spaces. The flexibility of these pooling techniques may enable such features as flexible capacity allocation, delayed binding, thin provisioning, and the participation of a storage device in two or more distinct pools shared with different sets of storage devices.

20 Claims, 11 Drawing Sheets

(56) References Cited

U.S. PATENT DOCUMENTS

| | | | |
|---|---|---|---|
| 2011/0010496 A1* | 1/2011 | Kirstenpfad et al. | 711/114 |
| 2012/0066469 A1* | 3/2012 | Yochai et al. | 711/170 |

FOREIGN PATENT DOCUMENTS

| | | |
|---|---|---|
| CN | 101976174 A | 2/2011 |
| CN | 102945212 | 2/2013 |
| GB | 2373075 A | 9/2002 |
| WO | 2011095445 A1 | 8/2011 |

OTHER PUBLICATIONS

Ganger, et al., "Soft Updates: A Solution to the Metadata Update Problem in File Systems", Retrieved at <<http://www.hpl.hp.com/personal/Craig_Soules/papers/TOCS.softupdates.pdf>>, ACM Transactions on Computer Systems, vol. 18, No. 2, May 2000, pp. 127-153.

Brandt, et al., "Efficient Metadata Management in Large Distributed Storage Systems", Retrieved at <<http://ieeexplore.ieee.org/stamp/stamp.jsp?tp=&arnumber=1194865>>, Proceedings of the 20 th IEEE/11 th NASA Goddard Conference on Mass Storage Systems and Technologies, 2003, pp. 9.

Soares, et al., "Meta-Data Snapshotting: A Simple Mechanism for File System Consistency", Retrieved at <<http://citeseerx.ist.psu.edu/viewdoc/download?doi=10.1.1.2.7416&rep=rep1&type=pdf>>, Proceedings of the international workshop on Storage network architecture and parallel I/Os, 2003, pp. 1-12.

"Backing up Storage Pools", Retrieved at <<http://publib.boulder.ibm.com/infocenter/tsminfo/v6/index.jsp?topic=/com.ibm.itsm.srv.doc/t_bkup_stgpool.html>>, Retrieved Date: Mar. 8, 2011, pp. 4.

"LDM / Dynamic Disks Basics", Retrieved at <<http://www.z-a-recovery.com/art-dynamic-disks.htm>>, Retrieved Date: Mar. 8, 2011, p. 1.

"Veritas Storage Foundation™ 4.3 for Windows® by Symantec", Retrieved at <<http://www.intel.com/pressroom/kits/itanium2/pdf/symantec_vsf_win.pdf>>, Apr. 2006, pp. 1-7.

"Logical Volume Manager (Linux)", Retrieved at <<http://en.wikipedia.org/wiki/Logical_Volume_Manager_(Linux)>>, Retrieved Date: Mar. 8, 2011, pp. 4.

"First Office Action and Search Report Issued in Chinese Patent Application No. 201210333564.8", Mailed Date: Nov. 27, 2014, 11 Pages.

"Supplementary Search Report Issued in European Patent Application No. 11872162.0", Mailed Date: Apr. 22, 2015, 7 Pages.

\* cited by examiner

POOLED PARTITION LAYOUT AND REPRESENTATION

BACKGROUND

Within the field of computing, many scenarios involve a set of one or more storage devices (e.g., platter-based magnetic and/or optical hard disk drives, solid-state storage devices, and nonvolatile memory circuits) that may be allocated in various ways. As a first example, the storage space provided by a storage device may be grouped into one or more partitions, each of which may store data associated with one or more logical drives reflected in an operating environment. As a second example, the capacity of two or more storage devices may be combined in many ways to provide additional storage features, e.g., various Redundant Array of Inexpensive Disks (RAID) schemes that provide features such as improved throughput, automatic mirroring, and automatic parity computations. As a third example, the storage space may be accessible to one or more computers (e.g., a network-attached storage device that is concurrently accessible to several computers on a network). More complex techniques may also be provided by such devices, such as journaled spaces and thin provisioning.

The design choices involved in such scenarios result in metadata indicating the number, types, capacities, allocations, and features provided by the storage devices of the storage set, as well as the pooling arrangements of one or more storage devices. This metadata may be stored in many ways, such as in the memory of a storage controller (e.g., a RAID controller configured to store information about a RAID scheme applied to the storage devices), or in standardized locations on one or more storage disks of the storage set. For example, a storage device may comprise, at the beginning of the storage space, a master boot record (MBR) listing the numbers, locations, sizes, and types of partitions stored on the storage device, and, at the end of the storage space, a logical disk model (LDM) database indicating the logical drives exposed by the partitions.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

The manner of persisting metadata describing a storage set may present various advantages and/or disadvantages. As a first example, metadata stored in the memory of a storage controller may be rapidly accessible, but may complicate the migration of a storage device to a different storage controller or computer (e.g., if a storage device is relocated to a different machine or array, the data on the storage device may be inaccessible if the partition information is not stored on the same storage device). As a second example, storing metadata for an array on only one storage device that subsequently fails may result in loss of data on several or all of the storage devices of the storage set. As a third example, sharing a storage device concurrently with two or more computers, where each may update the metadata, may result in race conditions and/or versioning conflicts among mirrored versions of the metadata. As a fourth example, storing the metadata on a storage device in a new manner may reduce the compatibility and/or accessibility of the storage device with other storage devices and/or computers (e.g., the metadata may not be readable and/or usable by devices that are not accordingly configured), and may result in an overwriting of the metadata and a loss of data and/or functionality. As a fifth example, some representations may not permit a storage device to participate in multiple storage pools that are distributed across different sets of storage devices (e.g., a first pooled partition shared with a first set of storage devices and a second pooled partition shared with a second, different set of storage devices), or to participate in the same storage pool in different roles (e.g., a single storage device featuring a pooled partition including first partition for user data, and a second partition allocated on the same storage device for parity data for the user data).

Presented herein are techniques for storing the metadata identifying the storage devices and storage spaces, as well as the provisions and pooling arrangements, of the storage devices in a storage set. In accordance with these techniques, one or more storage devices may share a pooled partition comprising a pool configuration and a set of extents. The pool configuration may represent the pooled partition as a pool record (identifying the pool); a set of space records representing various spaces manifested by the pooled partition (e.g., volumes for user data, maintenance spaces, and journal spaces storing a journal for the user data); a set of storage device records representing the storage devices participating in the pool; and a set of extent records that map allocations of a physical location within the pooled partition on a storage device to a logical location within a space of the pooled partition. The pool configuration may be stored at the top of the pooled partition of each storage device in a mirrored fashion to provide access to a consistent metadata representation of the pooled partition on any storage device. A request to manifest a space within a pooled partition may be fulfilled by generating a space record representing the space, possibly including a provisioned capacity of the space. Extents may also be allocated and bound to the space in order to allocate physical capacity to the space. This binding may be performed promptly upon creating the space, or may be delayed until the capacity of the space is utilized. Additionally, among the computers accessing the pooled partition, a pool configuration owner may be identified that is exclusively permitted to update the pool configuration, and any requests to alter the pool configuration (e.g., adding a space or allocating an extent to a space) may be forwarded to the pool configuration owner.

This representation of a pooled partition may enable several advantages over other representations of a pooled partition. As a first example, the data within the pooled partition of a storage device may remain accessible if the storage device is relocated (e.g., to a different machine or a different storage array), or if another storage device sharing the pooled partition crashes or becomes unavailable, because the pool configuration is mirrored on each storage device sharing the pooled partition. As a second example, this representation differentiates the provisioning of a space from the allocation of extents, which may be performed in a delayed manner, such as on a just-in-time basis. This differentiation may enable various types of flexibility of the storage set, such as an easy manner of reallocating extents to resize the spaces, a rapid provisioning technique that does not involve the allocation of capacity on the storage devices, and the capability of thin provisioning (e.g., provisioning a space with capacity exceeding the available physical capacity of the storage devices, with the option of fulfilling the provisioned capacity by adding physical storage capacity in the form of additional storage devices as the capacity of the space is exhausted). As a third example, a pooled partition represented in this manner may span two or more partitions on the same storage device. As a fourth example, a first pooled partition may coexist with non-pooled partitions (which may be accessible on storage systems that do not recognize the pooled partition). As a fifth example, a storage device may store two or more pooled partitions that are respectively shared with different sets of other storage devices. As a sixth example, the selection of a pool configuration owner among the computers or devices that may access the storage devices may reduce race conditions that may result in asynchrony of the pool configuration that may otherwise occur in the event that two or more devices concurrently update the pool configuration. These and other advantages may be achievable through the representation of a pooled partition according to the techniques presented herein.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
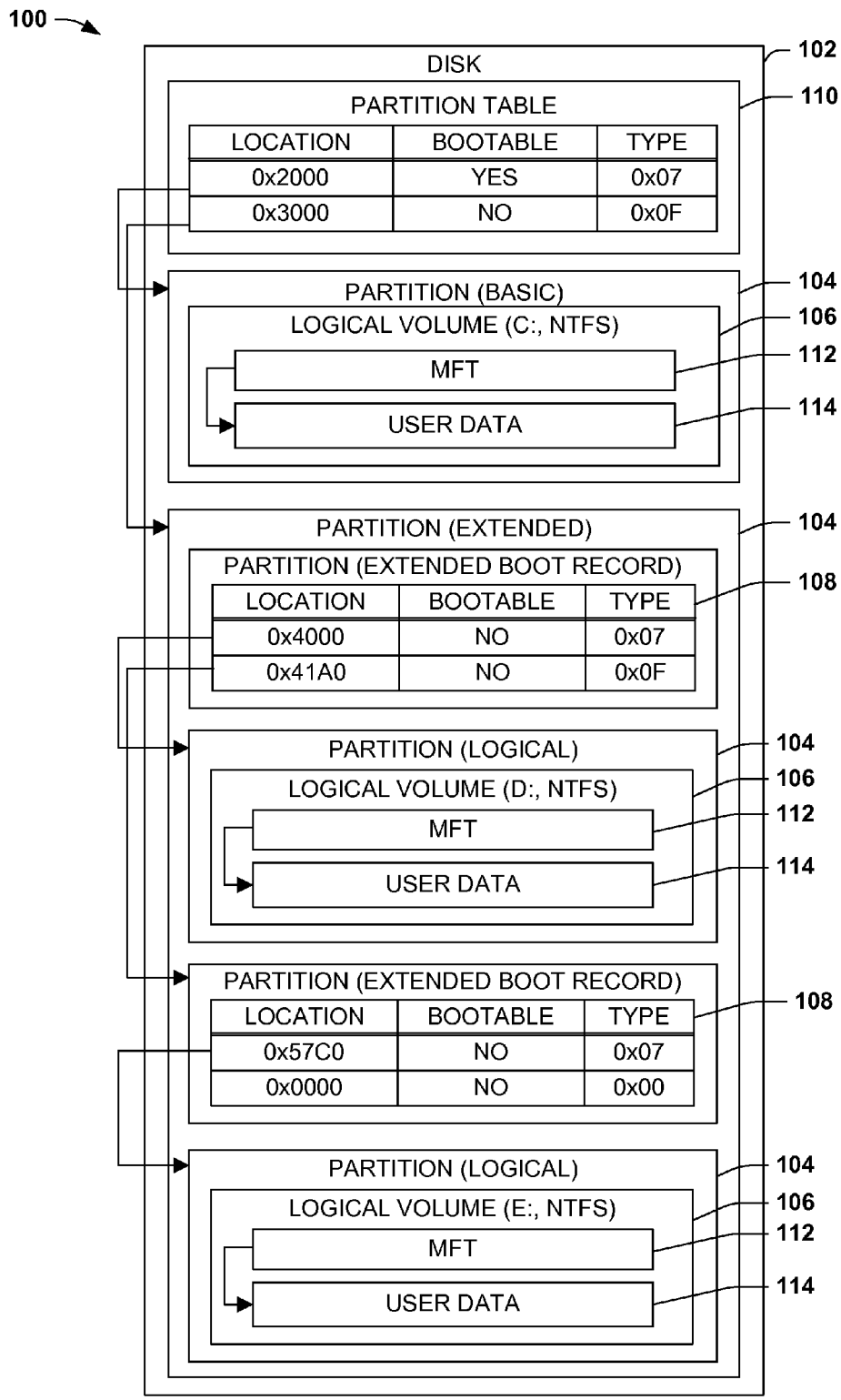
FIG. 1 is an illustration of an exemplary scenario featuring an allocation of the capacity of a storage device into a set of partitions, and a representation of the configuration of the partitions on the storage device.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

A. Introduction

Within the field of computing, many scenarios involve a storage device (e.g., a hard disk drive, a solid state storage device, or a volatile or nonvolatile memory circuit) configured to store data on behalf of one or more computers or other devices. The data stored may comprise many types of objects (e.g., files, media objects, media objects, data sets, or database records) and may be organized in various ways (e.g., as a collection of named objects, as a hierarchy, or in a relational manner). However, at a lower level, the storage device is often configured according to a layout that is usable by the device; e.g., regardless of the type and organization of data to be stored, the storage device is often organized (e.g., organized) in a particular manner that computers and other devices are capable of reading. As one such example, the available capacity of the storage device is often organized as a set of partitions, and a partition table generated at the beginning of the storage device indicates the locations, sizes, and types of the partitions. The segregation of the capacity of the storage device into volumes may provide various advantages (e.g., different partitions may isolate different groups of data; may be used to manifest different volumes; or may be differently organized to store different types of data, and/or to store data for access on different computers or devices that utilize different types of partitions).

FIG. 1 presents an illustration of an exemplary scenario 100 featuring a storage device 102 having data storage capacity organized as a series of partitions 104. In this exemplary scenario 100, respective partitions 104 are configured to store various types of user data 114, including one or more logical volumes 106 that may be manifested on a computer or device, further formatted with a file system, and used to store a set of files. For example, the storage device 102 may comprise a first partition 104 organized in a basic manner, and capable of storing one logical volume 106 comprising a master file table 108 representing a catalog of files comprising the user data 112 of the logical volume 106. The storage device 102 may also comprise a second partition 106 organized in an extended manner, and therefore capable of storing more than one logical volume 106. For example, the second partition 106 may include two logical volumes 106, each contained in a third partition 106 (within the extended second partition 106) that in turn contains data comprising a logical volume 106. Information about the top-level partitions 104 may be contained in a partition table 110 stored at the beginning of the available capacity of the storage device 102 and containing metadata for each partition 104, including the physical location where the partition 104 begins, whether or not the partition 104 comprises information to enable a computer to boot into an operating environment, and/or a partition type indicator identifying the type of the partition 104 (e.g., a basic partition type for the first partition 104 and an extended partition type for the second partition 104), and the extended second partition 104 may precede each contained partition 108 with a master file table (MFT) comprising metadata about the contained partition 108. In this manner, the capacity of the storage device 102 may be organized as a set of partitions 104, each comprising one or more logical volumes 106, and may therefore expose compartmentalize the storage capacity of the storage device 102 into several logical volumes 106.

While the exemplary format of partitions 104 in the exemplary scenario 100 of FIG. 1 may satisfy some scenarios, it may be desirable to design the format in a manner that enables some additional features. As a first example, it may be desirable to establish a relationship between two or more partitions 104, such as a mirrored relationship (where an identical data set is stored in each partition 104, and where changes to the data within one partition 104 are automatically propagated to other partitions 104). Such mirroring may promote the durability of the data set in the event of data corruption; e.g., in the event of a corruption of a partition 104, or a failure of a storage device 102 comprising a partition 104, the data set may remain intact and accessible if mirrored in a second partition 104 (possibly on a different storage device 102). Mirroring may also improve performance; e.g., a first storage device 102 may be limited to a set of performance characteristics (e.g., a minimum latency involved in initiating an access request, or a maximum sustainable throughput while accessing the data), and mirroring a data set across two or more storage devices 102 may enable performance characteristics representing the sum of all of the storage devices 102. A second feature that may be enabled by some formats of storage devices 102 is the spanning of a data set across the partitions 104 of two or more storage devices 102. For example, in the exemplary scenario 100 of FIG. 1, the size of a logical volume 106 is limited to the size of the partition 104 comprising the logical partition 106, which in turn is limited to the available capacity of the storage device 102. However, other formats may be enable a pooling of two or more partitions of one or more storage devices 102, thereby exceeding the size limitations of any one partition 104 or storage devices 102. The formatting of storage devices 102 may also be devised to promote error detection and error correction (e.g., for respective data sets, a storage device 102 may automatically generate and store a set of verifiers, such as checksums, that may be compared with the contents of the data sets to detect and possibly incorrectly written data) and shared access to the data set (e.g., a storage set 102 may enable multiple computers or other devices without exposing the data set to write-based race conditions, which may result in inconsistent or non-deterministic updates to the data set).

Accordingly, the basic format exhibited in the exemplary scenario 100 of FIG. 1 may be extended to enable features such as mirroring, concurrent access, fault tolerance, and error detection and correction. For example, a set of storage devices 102 may be organized according to a Redundant Array of Inexpensive Disks (RAID) scheme, which may be implemented in hardware and/or software to implement such features. As a first example, in a RAID 0 scheme, data stored in several partitions 104 of several storage devices 102 is presented as a single logical volume 104. As a second example, in a RAID 1 scheme, data stored is automatically mirrored across several partitions 104 on one or more storage devices 102, thereby enabling faster access to the data set and/or fault tolerance in the event that a storage device 102 or partition 104 becomes unreliable or inaccessible. As a third example, in a RAID 4 scheme, checksums are computed for respective portions of a data set that may be used to verify the integrity of the data set (e.g., that data written to the data set is consistently read from the data set, and is not inadvertently changed during storage), and/or to recover from a failure of a partition 104 and/or storage device 102 (e.g., if a partition 104 of a storage device 102 becomes corrupted, or if the storage device 102 is removed, the data contained in the partition 104 may be recoverable using the checksums of the missing data and other portions of the data set represented by the checksum). RAID schemes, as well as other format specifications, thereby enable these and other features through the particular organization and accessing of data on the storage devices 102.

Figure 2:
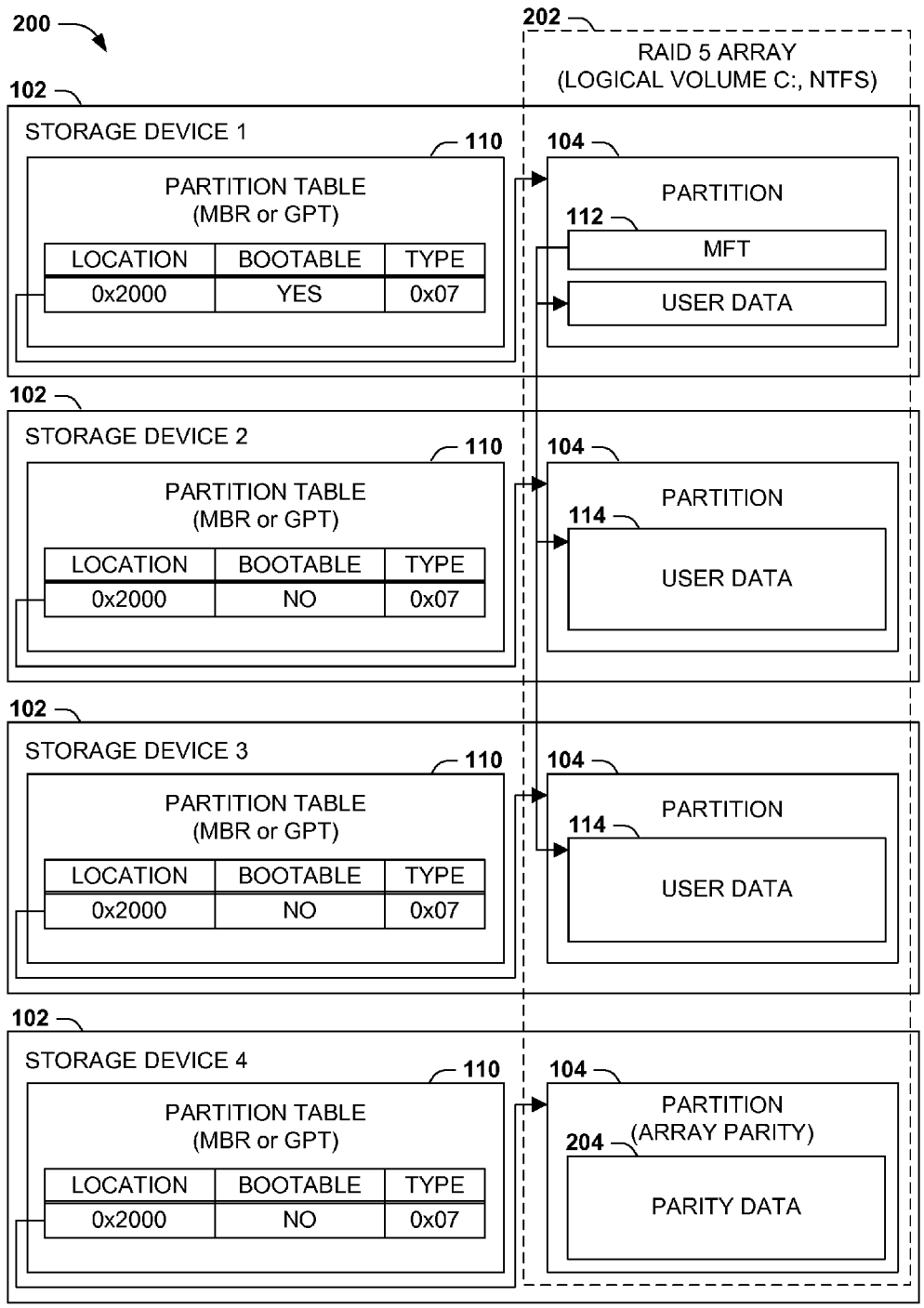
FIG. 2 is an illustration of an exemplary scenario featuring an allocation of the capacity of a storage set into a volume spanning several storage devices in accordance with a Redundant Array of Inexpensive Disks (RAID) level 5 storage scheme.

FIG. 2 presents an illustration of an exemplary scenario 200 featuring a formatting of a set of four storage devices 102 according to a RAID 4 scheme in order to establish a pool 202 of capacity having particular storage features. In this exemplary scenario 200, respective storage device 102 are configured to store user data 114 in a logical volume 106 extending across several partitions 104, and to automatically generate and store parity data 204 in order to verify the integrity of the user data 114 and to recover the data set in the event of a failure of a storage device 102. Accordingly, each storage device 102 may store a partition table 110 at the beginning of the storage device 102 comprising metadata describing the partitions 104 of the storage device 102. Each storage device 102 also stores a partition 104. The partitions 104 of the first three storage devices 102 are configured as a pool 202 presenting a single logical volume 106 (e.g., a master file table 112 and user data 114). Additionally, the capacity of a fourth storage device 102 is included in the pool 202 but is reserved for parity data 204, which is automatically calculated for corresponding data sets stored in the first three storage devices 102. For example, for a word of data stored at a particular physical address in the partitions 104 of the first three storage devices 102, a word-length checksum may be computed and stored in the same physical address in the partition 104 of the fourth storage device 102. This formatting of the storage devices RAID 4 layout therefore enables the aggregation of the capacity of the storage devices 102 to generate a pool 202 presenting a logical volume 106 and verifier data that may improve the fault tolerance of the storage set 102.

However, the layout in the exemplary scenario 200 of FIG. 2 may present some limitations. As a first example, a RAID 4 schema may only be capable of pooling storage devices 102 having matching characteristics; e.g., it may not be possible to apply this schema with storage devices 102 of varying capacities (e.g., a one-terabyte storage device 102 and a two-terabyte storage device). This limitation may arise from the computation of checksums on the fourth storage device 102 for corresponding physical addresses of the data sets on the first three storage devices 102; e.g., the algorithm may be unable to adapt these computations (without diminished performance) to storage devices 102 of different sizes. As a second example, a RAID 4 schema may exhibit diminished consistency, reliability, and/or performance for storage sets comprising storage devices 102 with different performance characteristics (e.g., even if the storage devices 102 are identically sized, differences in the latency and throughput characteristics of storage devices 102 of different makes and/or models may result in problems or diminished performance of the storage set). As a third example, the interdependence of the storage devices 102 may diminish the portability of any one storage device 102. For example, it may not be possible to access the contents of a storage device 102 if transferred to a different array, because the metadata describing the contents of the storage device 102 may be interrelated with the other storage devices 102 and/or the controller thereof (e.g., the metadata describing the pool 202 may be stored on a separate memory component of a RAID controller, and transferring one or more storage devices 102 to a different RAID controller may fail to transfer the metadata, resulting in an inaccessibility of the data set). As a fourth example, the formatting of these storage devices 102 may only be usable by systems (e.g., storage controllers and software) that are configured to support a RAID 4 scheme. As a fifth example, this scheme may utilize all of the capacity of all of the storage devices 102. Therefore, it may not be possible to allocate some capacity on these storage devices 102 for use outside of the pool 202, e.g., as a second partition 104 outside of the pool 202, or as a partition 104 participating in another pool 202 with the same or other storage devices 102. Moreover, it is difficult to implement different RAID schemes on a set of storage devices 102; e.g., a RAID controller may be configured to apply one RAID scheme to the entire capacity of all of the storage devices 102 at its disposal.

Figure 3:
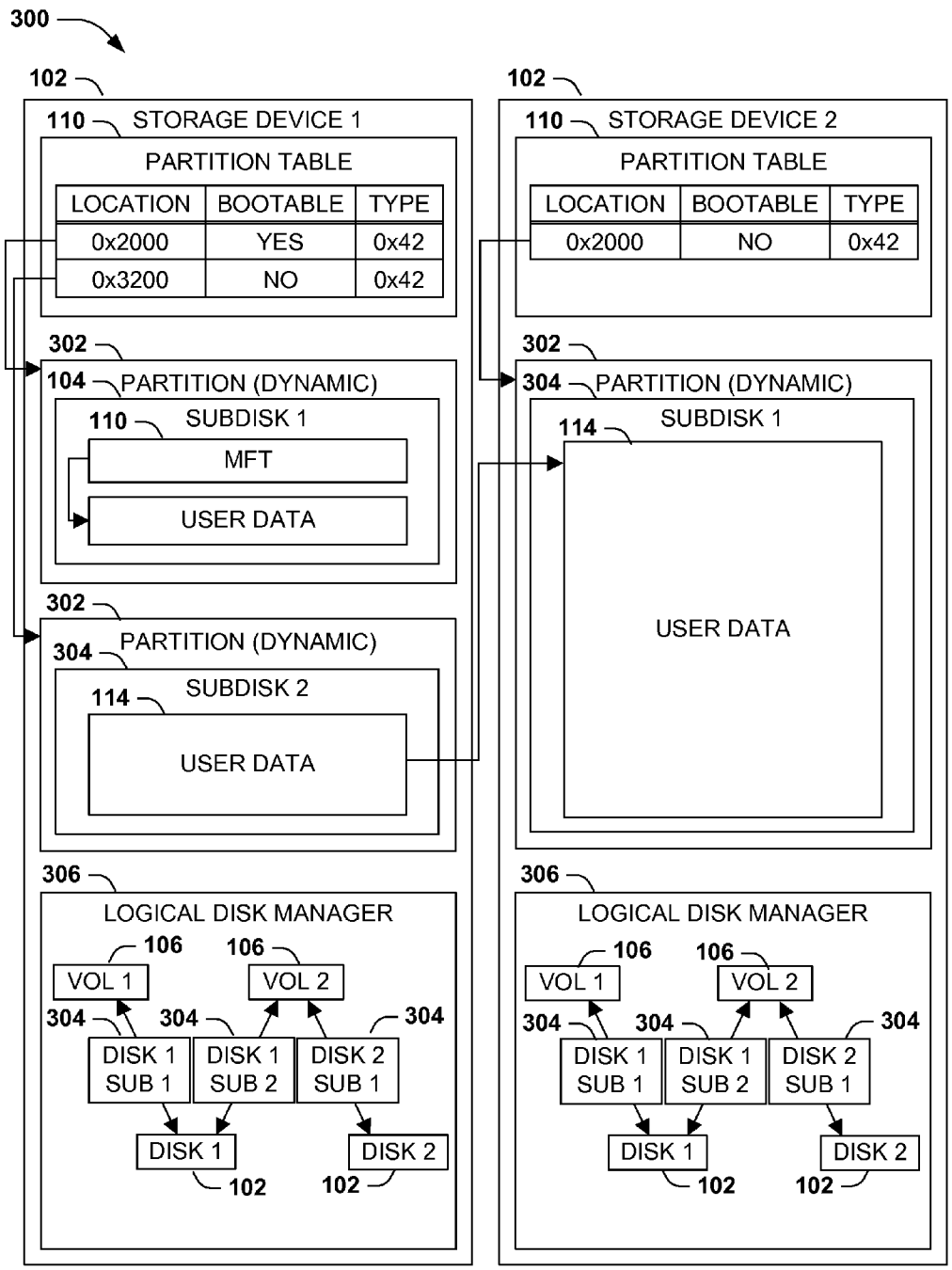
FIG. 3 is an illustration of an exemplary scenario featuring an allocation of the capacity of two storage devices into a dynamic partition spanning the storage devices, and a representation of the dynamic volume on the storage devices.

FIG. 3 presents an illustration of an exemplary scenario 300 featuring an exemplary formatting of storage devices 102 in accordance with a Logical Disk Manager (LDM) scheme that may overcome some of the limitations of the exemplary scenario 200 of FIG. 2. In this exemplary scenario 300, two storage devices 102 are organized to begin with a partition table 110 followed by a dynamic partition 302 comprising a set of subdisks 304, representing large, allocated blocks of contiguous physical addresses that may be aggregated to manifest logical volumes 106, including a logical volume 106 spanning both storage devices 102 and representing a pool 202 of the capacity of the dynamic partition 302 of the first storage device 102 and the dynamic partition 302 of the second storage device 102. The dynamic partition may be logically represented, e.g., as a sequence of logical addresses aggregated from a first subdisk 304 stored in the dynamic partition 302 of the first storage device 102 and a second subdisk 304 stored in the dynamic partition 302 of the second storage device 102. Though comprising separate blocks of physical addresses on different storage devices 102, the subdisks 304 are aggregated and manifested as a contiguous block of logical addresses. Additionally, the metadata for the pool 202 is stored in a logical disk manager (LDM) database 306 located at the end of each storage device 102 that represents the allocation of the subdisks 304 of the storage devices 102 as logical volumes 106. For example, in this exemplary scenario 300, the logical disk manager database 306 indicates that the first storage device 102 comprises two subdisks 304, and that the second storage device 102 comprises one subdisk 304, but that the first subdisk 304 of the first storage devices 102 is manifested as a first logical volume 106, while the second subdisk 304 of the first storage device 102 and the sole subdisk 304 of the second storage device 102 are manifested together as a second logical volume 106. Moreover, the logical disk manager database 306 is mirrored on both storage devices 102, and is therefore portable with each storage device 102 to indicate the logical manifestations of the dynamic partitions 302 contained therein.

The formatting of the storage devices 102 with a logical disk manager database 306 may present some advantages. As a first example, as compared with the exemplary scenario 100 illustrated in FIG. 1, the logical disk manager database 306 enables the representation of a pool 202 of subdisks 304 on multiple storage devices 102. Also, as compared with the exemplary scenario 200 of FIG. 2, the formatting illustrated in the exemplary scenario 300 of FIG. 3 may be implemented on storage devices 102 of different sizes and/or different performance characteristics (e.g., the first and second storage devices 102 in FIG. 3 may have different total capacities generated by different manufacturers with different storage controllers). Additionally, as further compared with the exemplary scenario 200 illustrated in FIG. 2, the logical disk manager database 306 may enable the coexistence of a pool 202 with other partitions 104 that are not included in the pool 202 (e.g., the first partition 104 on the first storage device 102), and that may be accessible to and usable by systems (e.g., storage controllers and software) that are not capable of using the logical disk manager database 306.

However, the use of a logical disk manager database 306 to represent a pool 202 of subdisks 304 may also present some limitations. As a first example, many logical disk manager databases 306 are only capable of representing one pool 202, and it may be difficult to extend the logical disk manager database 306 to represent multiple pools 202 of subdisks 304. As a second example, the location of the logical disk manager database 306 at the end of the storage device 104 may limit the size of the logical disk manager database 306, and expanding the logical disk manager database 306 may involve rewriting the entire logical disk manager database 306 at a different location on each storage device 102. As a third example, it may be difficult to represent the manifestation of a logical volume 106 comprising only a portion of a partition 104. For example, and as similarly illustrated in the exemplary scenario 100 of FIG. 1, each partition 104 is entirely allocated to one logical volume 106. Because of this correspondence, it may be difficult to allocate partitions 104 in a flexible manner (e.g., distributing the capacity of a partition 104 across two or more logical volumes 106), and resizing a logical volume 106 (including a subdisk 304 contained therein) may involve significantly altering the partitions 104 of the storage device 102 (e.g., resizing a logical volume 106 may involve reallocating the partitions 104, possibly involving a complete rewriting of the data stored in the partition 104).

B. Presented Techniques

Presented herein are techniques for formatting storage devices 102 that may address some of the limitations of other formatting techniques, including those exhibited by the logical disk manager (LDM) database 306 in the exemplary scenario in FIG. 3. In accordance with these techniques, a format may be devised that organizes the available capacity of a storage device 102 in a manner that facilitates the implementation of various storage features (e.g., the generation of one or more pools 202 of storage capacity shared by multiple storage devices 102; the specification and automated application of various coordinated storage features, such as mirroring in a RAID 1 array or checksumming in a RAID 4 array; and concurrent access by multiple computers or devices). Such techniques may also promote the robustness of the storage set stored on the storage devices 102 (e.g., the preservation of the metadata for a storage device 102 if relocated to a different storage controller); the flexibility of the organization (e.g., facilitating the resizing of partitions 104, the allocation and reallocation of the available capacity of the storage device 102, and the compatibility of the organization with other organizational techniques (e.g., enabling a storage device to include both more complex organizational structures, such as a pool 202 of storage synchronized with other storage devices 102, and standardized structures, such as basic partitions 104).

Therefore, in accordance with these and other considerations, the techniques presented herein involve organizing a storage device 102 to include one or more pooled partitions that, respectively, may be shared with other storage devices 102 and may implement various storage features (e.g., different RAID schemes or other features). In a coarse-granularity view of the storage device 102, a pooled partition is allocated in a similar manner as other partitions 104, e.g., as a block of available capacity set aside and indexed in the partition table 110. Thus, a pooled partition may coexist with other partitions 104 of different types. However, the capacity of the pooled partition is utilized in a different manner. As a first example, the metadata describing the pooled partition is stored not in a separate structure (e.g., a logical disk manager database 306), but within the pooled partition, thereby enabling multiple pooled partitions to be stored on the same storage device 102 of arbitrarily different types (e.g., shared with different sets of other storage devices 102, and/or implementing different RAID schemes or other storage features). As a second example, the pooled partition may define a set of spaces, which may represent different constructs (e.g., logical volumes 106 storing user data; maintenance metadata for the spaces, such as staleness suggesting a resynchronization or failure suggesting the replacement of a storage device 102; or a journal configured a as a temporary store of writes to the storage set). Moreover, rather than allocating the capacity of a partition 102 entirely to one logical volume 106, or in a small number of large, contiguous blocks to a small number of logical volumes 106, the capacity of the pooled partition may be allocated in small blocks (referred to herein as "extents") that may be mapped to respective spaces. These associations may be stored in the pooled partition configuration. Moreover, the associations may facilitate the resizing of spaces (e.g., by allocating or deallocating extents), as well as other features, such as delaying the provisioning and/or binding of extents for the spaces, thereby enabling features such as thin provisioning. These and other features may be achievable through the formatting and organization of storage devices 102 according to the techniques presented herein.

Figure 4:
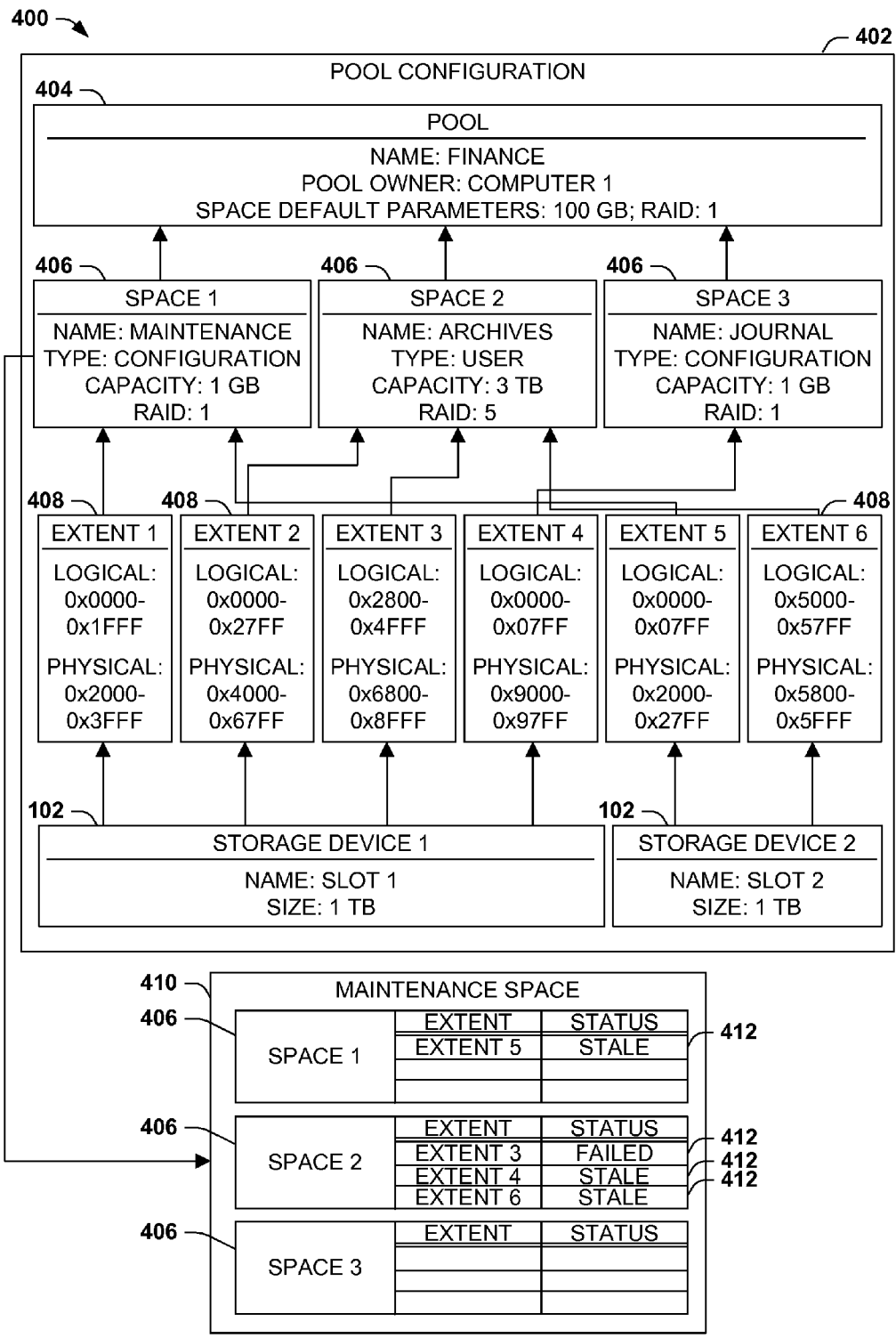
FIG. 4 is an illustration of an exemplary scenario featuring an allocation of a pooled partition comprising a set of spaces bound to a set of extents allocated on storage devices sharing the pooled partition, and the representation of the pooled partition on the storage devices, in accordance with the techniques presented herein.

FIG. 4 presents an illustration of an exemplary scenario 400 featuring an exemplary representation of a storage device 102 that may enable these and other features. For contrast, in the exemplary scenario 300 of FIG. 3, the logical disk manager database 306 represents the provisioning of the storage devices 102 as a set of logical volumes 106 and a set of storage devices 102, associated by a set of subdisks 304 stored in respective dynamic partitions 302. In this exemplary scenario 400, the provisioning is represented as a pool 404 (e.g., represented by a pool record storing metadata for the pool 404, such as a name of the pool 404 and identifying an owner of the pool 404), and as a set of spaces 406 manifested from the pool 404 (e.g., represented by space records storing metadata for respective spaces 406, such as a name of the space 406, a type of the space 406, a provisioned capacity of the space 406, and storage features implemented by the space 406, such as a RAID scheme). Many types of spaces 406 may be manifested by the pool 404, including a logical volume 106 providing capacity for user data; a maintenance space 410 storing metadata about the other spaces 406 of the pool 404, such as health indicators 412 representing the health (e.g., staleness, failure, or unavailability) of the respective spaces 406; a checksum space storing checksums for other spaces 406, such as in a RAID 4 scheme; and a journal space configured to a journal where data sets to be written to another space 406 may be temporarily stored (e.g., in order to promote batch writes and/or reduce the RAID write hole). Physically, the provisioning is represented as a set of storage devices 102 (e.g., represented by storage device records storing metadata for the storage devices 102, including a name and a total capacity), and a set of extents 408 representing allocated portions of the storage devices 102 associated with respective spaces 406 (e.g., represented by an extent record mapping a range of physical addresses of a storage device 102 to a range of logical addresses of a space 406). The pool configuration 402 thus represents the provisioning of the physical capacity of the storage devices 102 to the pool 404 through the association of extents 408 allocated to the spaces 406 manifested within the pool 404.

Figure 5:
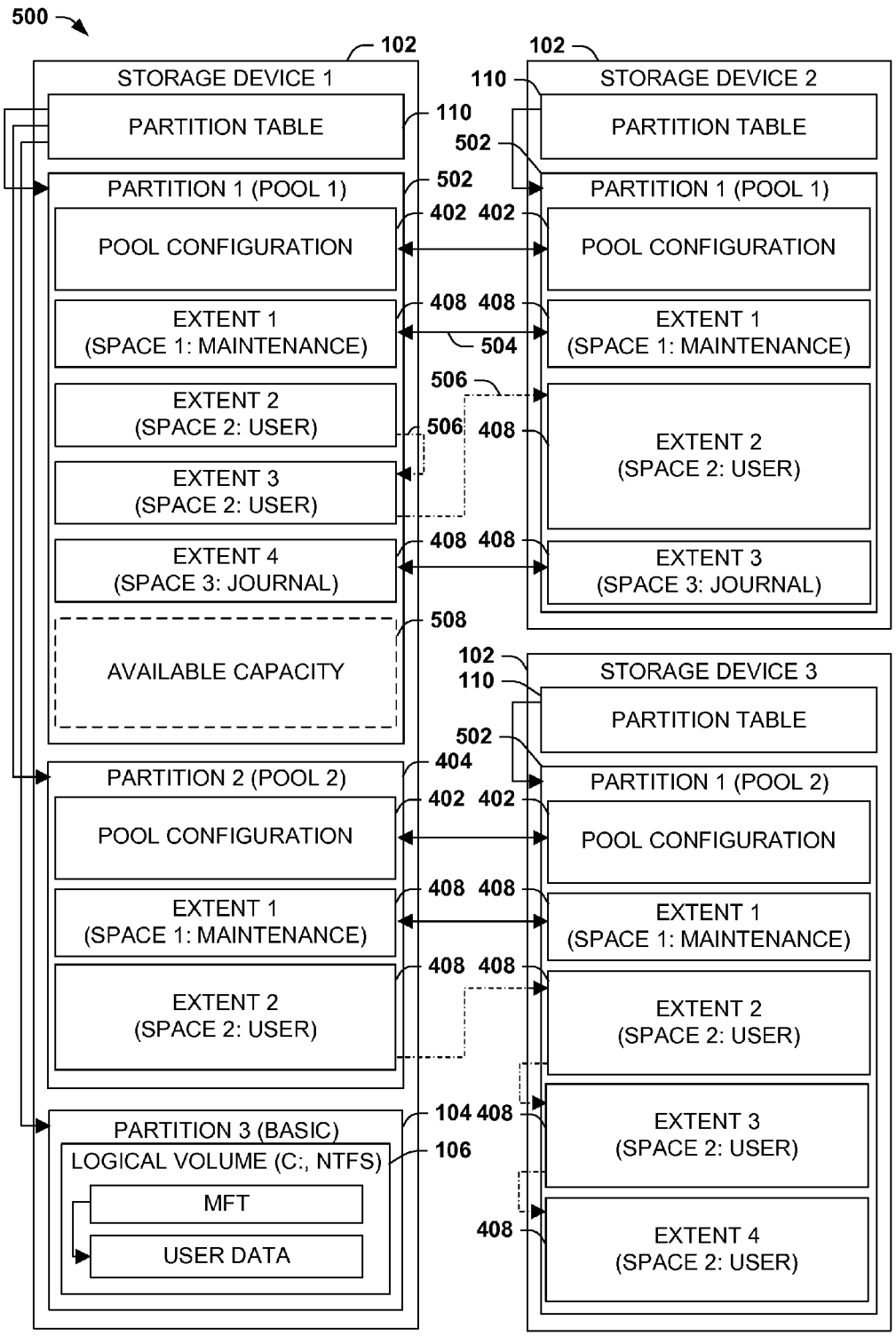
FIG. 5 is an illustration of an exemplary scenario featuring a storage device comprising two pools, each shared with a different other storage device, and the representations of the pooled partitions on the storage devices, in accordance with the techniques presented herein.

FIG. 5 presents an illustration of an exemplary scenario 500 illustrating an organization of storage devices 102 using the representation illustrated in the exemplary scenario 400 of FIG. 4. In this exemplary scenario 500, a first storage device 102 may be configured to store two pools 404, the first pool 404 shared with a second storage device 102 and the second pool 404 shared with a third storage device 102. The first storage device 102 begins with a partition table 110, followed by a first pooled partition 404 comprising spaces that are manifested in collaboration with a second pooled partition 404 stored on the second storage device 102. Both pooled partitions 404 begin with a pool configuration 402 comprising records describing the provisioning of the storage devices 102 according to the organization of the representation illustrated in FIG. 4. The pool configuration 402 identifies a set of spaces 406 manifested from the pool 104, and indicates the extents 408 (e.g., physical allocations) allocated within the pooled partitions 404 of the first and second storage devices 102 respectively mapped to a set of logical addresses of a space 406. For example, the first pooled partition 404 of the first storage device 102 stores four extents 408 that are respectively utilized as a maintenance space (e.g., the exemplary maintenance space 410 illustrated in FIG. 4); two extents 408 storing user data; and an extent 408 representing a journal for one or more other extents 408 and/or spaces 406 of the pooled partition 404. The allocation may provide some flexibility in the provisioning of physical storage space (e.g., extents 408) for the logical capacity of a space (e.g., the second space 406 begins with the second extent 408 of the first storage device 102, continues through a third extent 406 of the first storage device 102, and is logically followed by a second extent 408 on the second storage device 102). The pool configuration 402 may also represent various types of relationships among the spaces 408, such as a mirroring 504 of the maintenance space of the first storage device 102 and a corresponding maintenance space within the first pooled partition 404 of the second storage device 102. Moreover, the first pooled partition 404 on the first storage device 102 shared with the second storage device 102 may coexist with a second pooled partition 404 stored on the first storage device 102 and share with the third storage device 102, as well as a basic partition 104.

The organization of the storage devices 102 in the exemplary scenarios 400, 500 of FIGS. 4-5, in accordance with the techniques presented herein, may enable some advantages with respect to other organizations (including those presented in FIGS. 1-3). As a first example, the pool configuration 402 enables the specification of different types of spaces 406 (e.g., a maintenance space, a user data space, and a journal space), as well as the specification of storage features to be applied to each space 406 (which enables the use of different storage features, such as different RAID schemes, for different spaces 406). As a second example, the pool configuration 402 may define a set of spaces 406 manifested by the pool 404, but may present some flexibility in the allocation of extents 408 comprising the physical capacity of the storage devices 102 to the spaces 406 of the pool 404. For example, by allocating a series of small extents 408 instead of a large block such as a subdisk 304, this organization enables a fine-grain resizing of spaces 406 through the reassignment of extents 408. Additionally, the spaces 406 may be provisioned with a particular size, but an embodiment may allocate extents 408 and bind the physical addresses of the extents 408 to the logical addresses of the spaces 406 at a later moment, e.g., when a write is received to a location within a space 406 that is not yet bound to an extent 404. These concepts of delayed allocation and delayed binding may enable a rapid completion of the formatting of the storage devices 102 (e.g., not having to allocate and initialize all of the extents 408 upon receiving a request to create a space 406) and overprovisioning (e.g., creating a space 406 with a defined capacity exceeding the available capacity 508 of the storage devices 102, and when the used capacity of the space 406 exhausts the available capacity 508, prompting a user to add capacity to the storage set). These and other features may be achievable through the organization of the storage devices 102 as illustrated in the exemplary scenarios 400, 500 of FIGS. 4-5 and in accordance with the techniques presented herein.

C. Exemplary Embodiments

Figure 6:
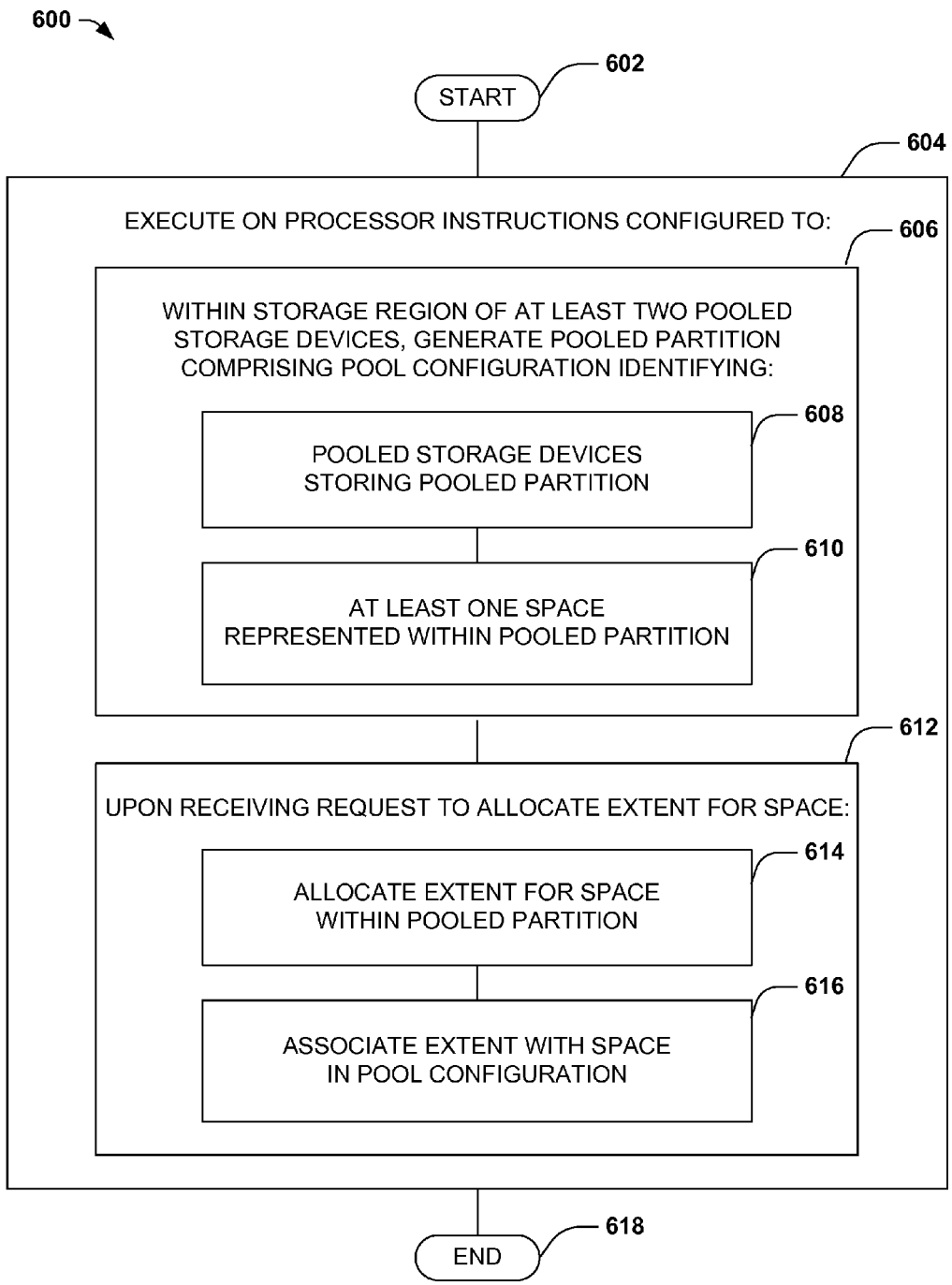
FIG. 6 is an illustration of a flow chart illustrating an exemplary method of apportioning a storage set comprising at least two storage devices in accordance with the techniques presented herein.

FIG. 6 presents an illustration of an exemplary embodiment of these techniques, illustrated as an exemplary method 600 of organizing a storage set comprising at least two storage devices 102. The exemplary method 600 may be implemented, e.g., as a set of instructions stored in a memory component of a device (e.g., a memory circuit, a platter of a hard disk drive, a solid-state memory component, or a magnetic or optical disc) that, when executed by a processor of a device, cause the device to perform the techniques presented herein. The exemplary method 600 begins at 602 and involves executing 604 the instructions on the processor. Specifically, the instructions are configured to, within a storage region of at least two pooled storage devices 102, generate 606 a pooled partition 502 comprising a pool configuration 402. The pool configuration 402 specifies 608, 610 the pooled storage devices 102 storing the pooled partition 402, and at least one space 406 represented within the pooled partition 402. The instructions are also configured to, upon receiving 612 a request to allocate an extent 408 for a space 406, allocate 614 an extent 408 for the space 406 within the pooled partition 402, and associate 616 the extent 408 with the space 406 in the pool configuration 402. In this manner, the instructions achieve the organization of the storage device 102 according to the techniques presented herein, and the exemplary method 600 so ends at 618.

Another embodiment involves a computer-readable medium comprising processor-executable instructions configured to apply the techniques presented herein. Such computer-readable media may include, e.g., computer-readable storage media involving a tangible device, such as a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a CD-R, DVD-R, or floppy disc), encoding a set of computer-readable instructions that, when executed by a processor of a device, cause the device to implement the techniques presented herein. Such computer-readable media may also include (as a class of technologies that are distinct from computer-readable storage media) various types of communications media, such as a signal that may be propagated through various physical phenomena (e.g., an electromagnetic signal, a sound wave signal, or an optical signal) and in various wired scenarios (e.g., via an Ethernet or fiber optic cable) and/or wireless scenarios (e.g., a wireless local area network (WLAN) such as WiFi, a personal area network (PAN) such as Bluetooth, or a cellular or radio network), and which encodes a set of computer-readable instructions that, when executed by a processor of a device, cause the device to implement the techniques presented herein.

Figure 7:
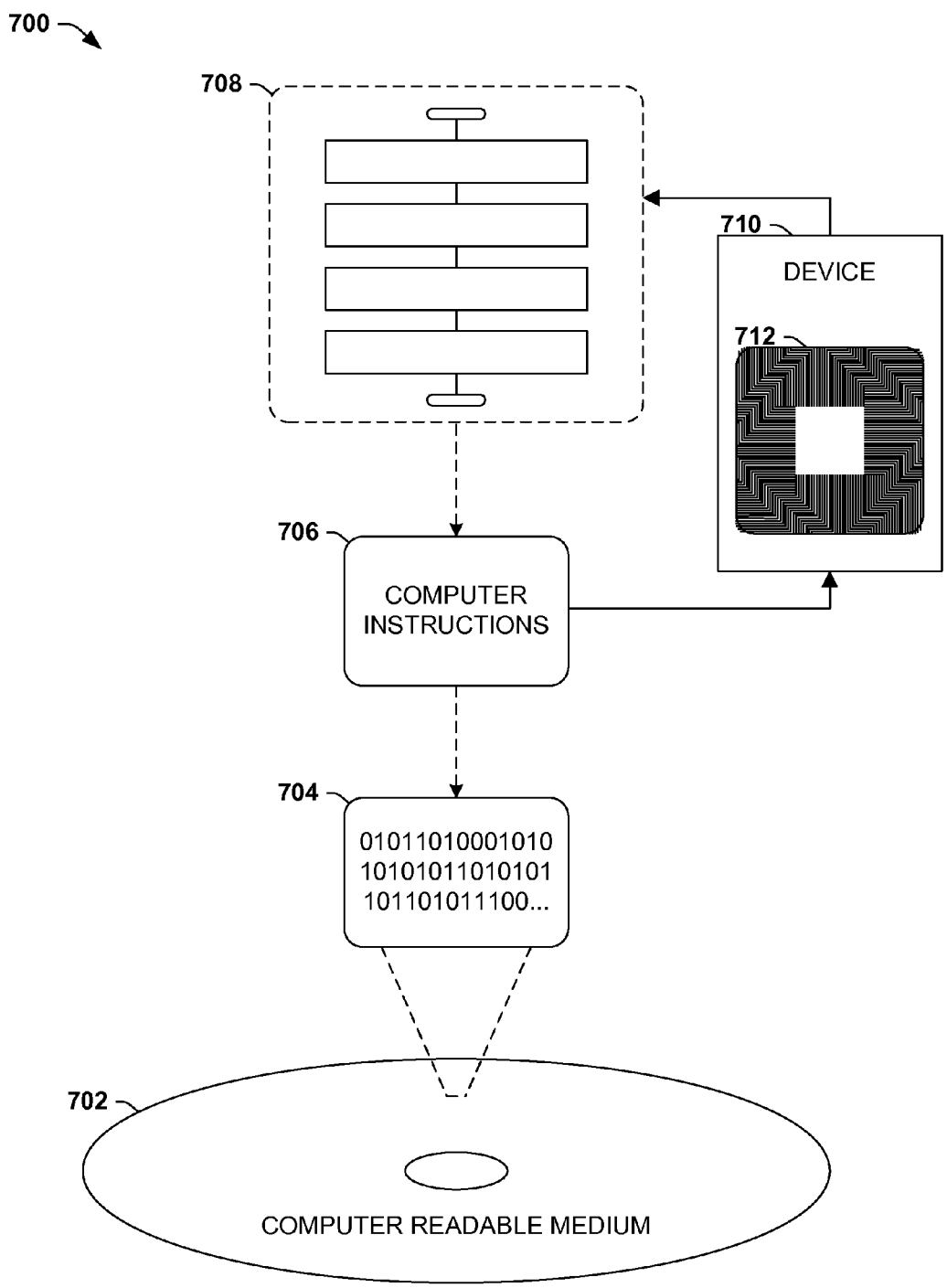
FIG. 7 is an illustration of an exemplary computer-readable medium comprising processor-executable instructions configured to embody one or more of the provisions set forth herein.

An exemplary computer-readable medium that may be devised in these ways is illustrated in FIG. 7, wherein the implementation 700 comprises a computer-readable medium 702 (e.g., a CD-R, DVD-R, or a platter of a hard disk drive), on which is encoded computer-readable data 704. This computer-readable data 704 in turn comprises a set of computer instructions 706 configured to operate according to the principles set forth herein. In one such embodiment, the processor-executable instructions 706 may, when executed by a processor 712 of a device 710, cause the device 710 to perform a method of organizing the capacities of storage devices 102, such as the exemplary method 600 of FIG. 6. Some embodiments of this computer-readable medium may comprise a nontransitory computer-readable storage medium (e.g., a hard disk drive, an optical disc, or a flash memory device) that is configured to store processor-executable instructions configured in this manner. Many such computer-readable media may be devised by those of ordinary skill in the art that are configured to operate in accordance with the techniques presented herein.

D. Variations

The techniques discussed herein may be devised with variations in many aspects, and some variations may present additional advantages and/or reduce disadvantages with respect to other variations of these and other techniques. Moreover, some variations may be implemented in combination, and some combinations may feature additional advantages and/or reduced disadvantages through synergistic cooperation. The variations may be incorporated in various embodiments to confer individual and/or synergistic advantages upon such embodiments.

D1. Scenarios

A first aspect that may vary among embodiments of these techniques relates to the scenarios wherein such techniques may be utilized. As a first variation of this first aspect, these techniques may be used with many types of storage devices 102, including hard disk drives, solid-state storage devices, nonvolatile memory circuits, tape-based storage devices, and magnetic and optical discs. Such storage devices 102 may also be directly connected to a device 710 (such as a computer) implementing these techniques; may be accessible through a wired or wireless local area network (e.g., an 802.11 WiFi network or ad-hoc connection, or an infrared connection); and/or may be accessible through a wired or wireless wide-area network (e.g., a cellular network or the internet). Moreover, these techniques may be used with two or more storage devices 102 operating independently (e.g., storage devices 106 that are accessed independently through a software process); operating with loose interoperation (e.g., storage devices 102 that operate independently but that are informed of and may communicate with the other storage devices 102 sharing the storage set); or operating with tight interoperation (e.g., a Redundant Array of Inexpensive Disks (RAID) controller managing several storage devices 106 as components of a storage system). As a second variation of this first aspect, these techniques may be used in conjunction with many types of storage sets comprising various types of data sets, including binary storage systems storing various types of binary objects; file systems storing files; media libraries storing media objects; object systems storing many types of objects; databases storing records; and email systems storing email messages. As a third variation of this first aspect, portions or all of these techniques may be implemented within one or more components within the computing environment, such as a set of software instructions stored in a volatile or nonvolatile of a computer or device having access to the storage devices 102 (e.g., an operating system process or a hardware driver); by a storage system configured to interface with the storage devices 102 (e.g., a RAID controller); or in respective storage devices 102 of the storage set.

As a fourth variation of this first aspect, these techniques for organizing the capacities of storage devices 104 may achieve some results that may be difficult to achieve with other techniques (such as those illustrated in FIGS. 1-3). As a first example, these techniques may enable the generation of a pooled partition 502 spanning and aggregating at least two partitions 104 on the first storage device 102. As a second example, these techniques may enable the generation of a space 406 comprising at least two extents 408 stored in the pooled partition 502 on a first storage device 102, as well as at least one extent 408 stored in the pooled partition 502 on a second storage device 102. As a third example, among a set of three storage devices 102, these techniques may enable a first storage device 102 to share a first pool 404 with the second storage device 102 and not the third storage device 102, and to share a second storage pool 404 with the third storage device 102 and not the second storage device 102. This type of sharing may not be achievable through the use of other techniques, such as a logical disk manager database 306, and in particular may not have enabled the storage devices 102 sharing a first pool 404 to update the pool configuration 402 in a manner that is isolated from updating the pool configuration 402 of a second pool 404 shared with a different set of storage devices 102. Many such storage scenarios may be achieved through the organization of the storage devices 102 in accordance with the techniques presented herein.

D2. Pool Configuration

A second aspect that may vary among embodiments of these techniques relates to the nature and use of the pool configuration 402 to represent the pool 404 shared by the storage devices 102. As a first variation of this second aspect, the pool configuration 402 may be stored on one storage device 102, or may be mirrored on the storage devices 102 storing the pool 404. As a second variation of this second aspect, a pooled partition 502 may be identified on a storage device 102 in many ways. For example, the storage device 102 may comprise a partition table 110 specifying the locations, sizes, and partition type identifiers of respective partitions 104, and the pooled partition 502 may be identified in the partition table with a pooled partition type identifier, which may be understandable and usable by devices 710 configured to utilize pooled partitions 502, and may be ignored (and therefore not misused) by other types of devices 710.

As a third variation of this second aspect, the pool configuration 402 may be stored in many areas of the pooled partition 502, including at the beginning of the pooled partition 502, at the end of the pooled partition 502, or at a defined or identifiable location in the pooled partition 502. It may be advantageous to position the pool configuration 402 at the beginning of the pooled partition 502 for easy access and/or to enable the growth of the pool configuration 402 (in contrast with positioning the pool configuration 402 at the end of the pooled partition 502, where growth may be difficult to achieve without rewriting the pool configuration 402 at a different location in the pool pooled partition 502). As a fourth variation of this second aspect, the pool configuration 502 may be structured in many ways, such as a relational database, a hierarchically structured document (e.g., an Extensible Markup Language (XML) document), or a table. As a fifth variation of this second aspect, the pool configuration 502 may contain various types of metadata describing the respective entities (e.g., the pool 402, the spaces 406, the extents 408, and the storage devices 102), including names, manufacturers, models, capacities, performance characteristics, and uses. In particular, the pool configuration 502 may specify a space type identifier to identify the types of respective spaces 406, such as a user space type identifier for a space 406 storing user data; a checksum space identifier for a space 406 storing the checksums (or other types of verifiers) of other spaces 406; and a journal space type identifier for a space 406 used as a journal for storing writes to be applied to other spaces 406. Additionally, spaces 406 may identify a parent space 406 to identify a sequential or nesting relationship (e.g., a second user data space 406 that is contiguous with a first user data space 406, or a journal space identifying a parent space for which the journal space stores journal updates to be applied to the parent space).

As a sixth variation of this second aspect, the extents 408 may be specified as a block of physical addresses within the pooled partition 502, either using a fixed physical location on the storage device 102 (e.g., track and sector), a physical address within the sequence of physical addresses on the storage device 102 (e.g., a physical address range), or an offset within the pooled partition 502 (e.g., the offset from the starting physical address of the pooled partition 502); and may also associate the address range with a logical address range within a space 406 (e.g., specifying a starting logical address and a length or an ending logical address).

Figure 8:
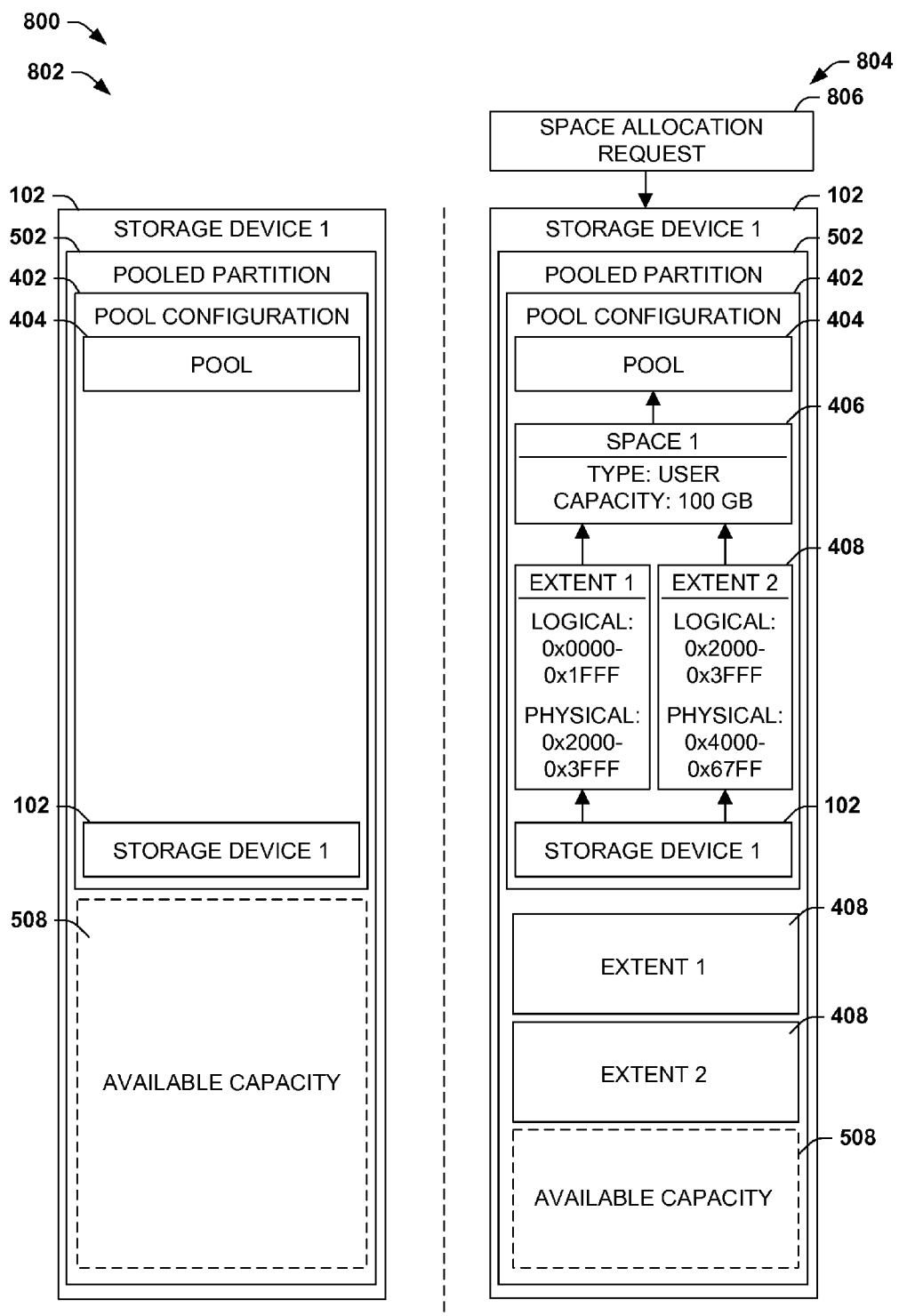
FIG. 8 is an illustration of a first exemplary technique for provisioning a space within a pooled partition of a storage device and allocating extents to the space.
Figure 9:
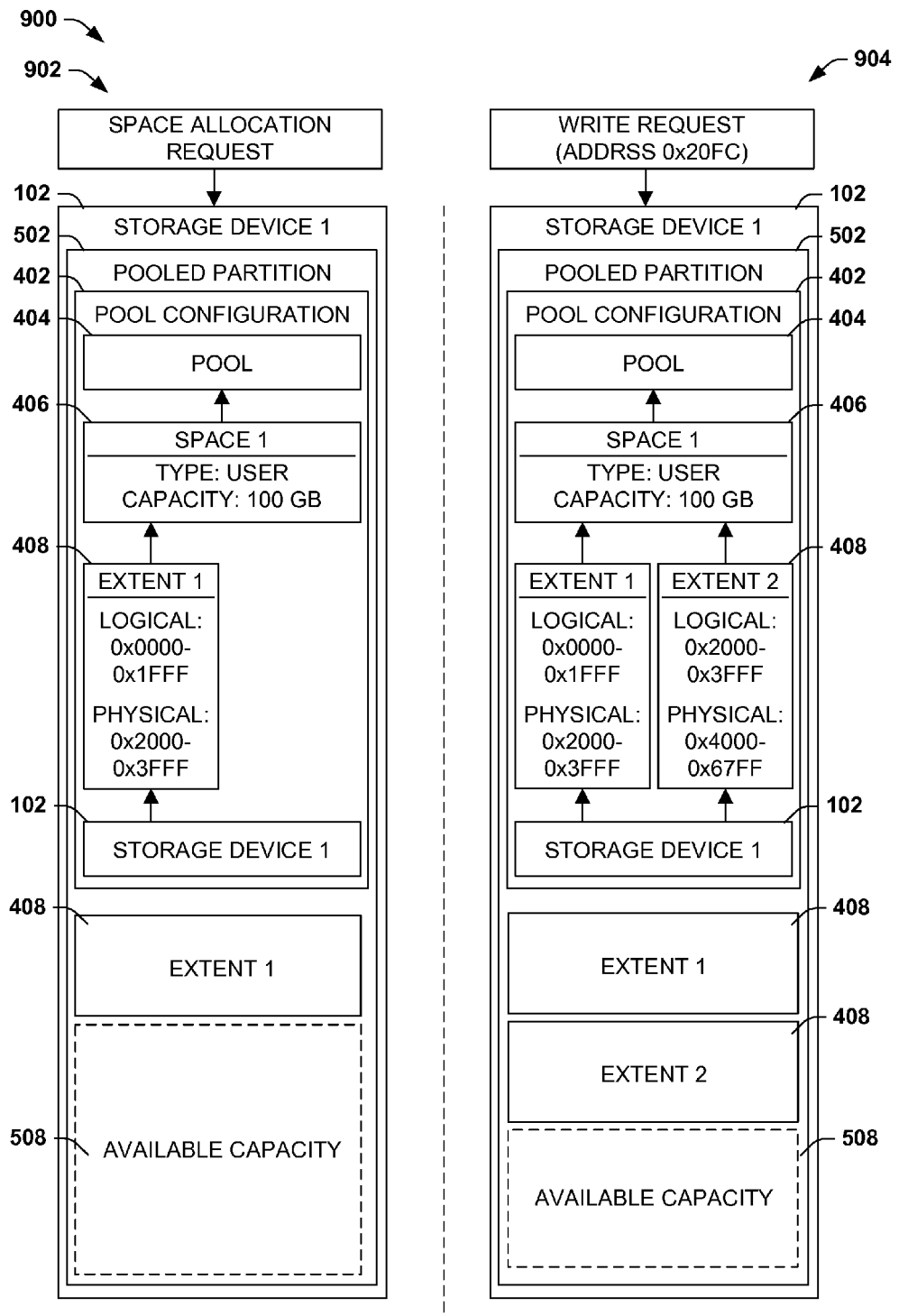
FIG. 9 is an illustration of a second exemplary technique for provisioning a space within a pooled partition of a storage device and allocating extents to the space.
Figure 10:
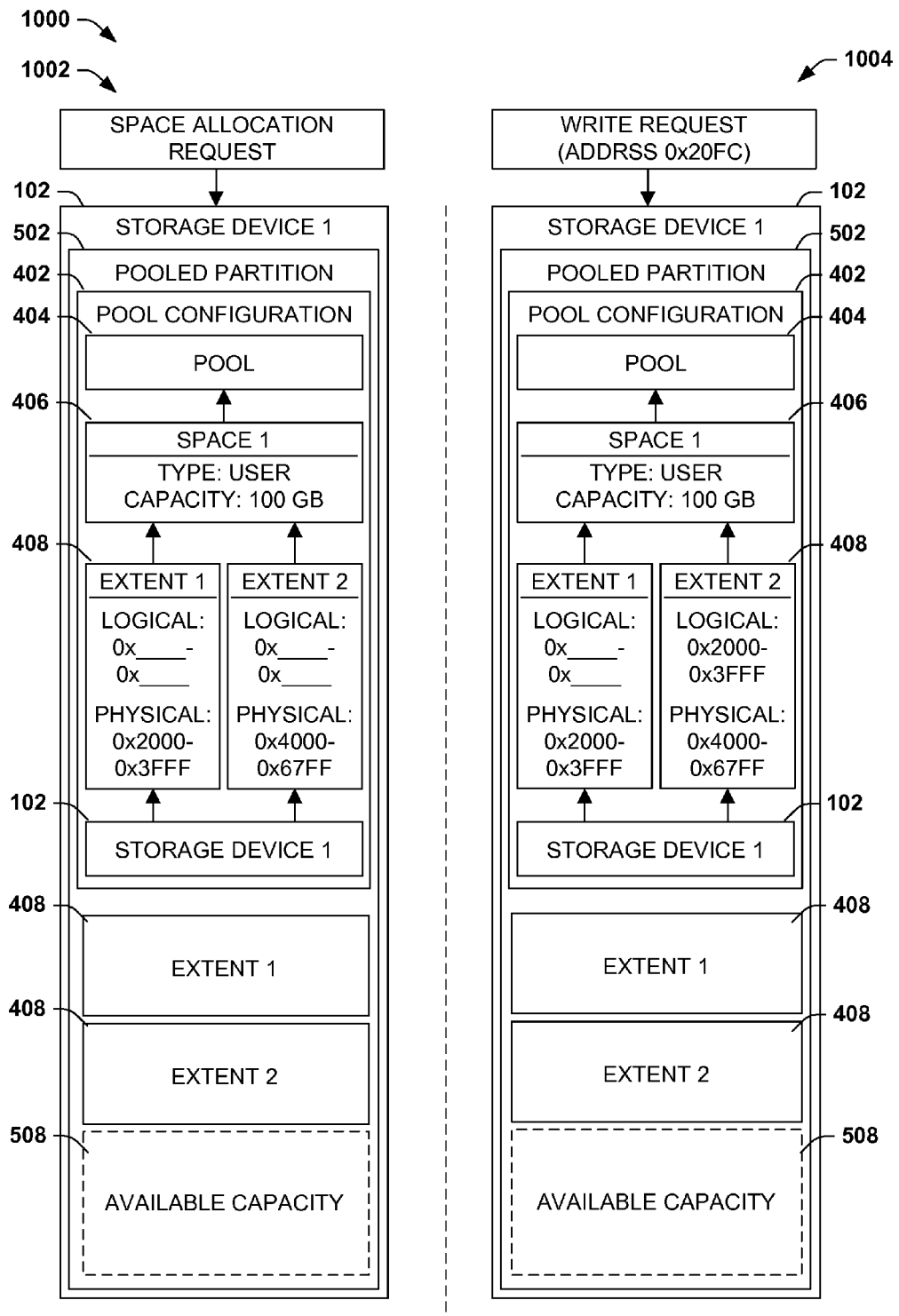
FIG. 10 is an illustration of a third exemplary technique for provisioning a space within a pooled partition of a storage device and allocating extents to the space.

As a seventh variation of this second aspect, the allocation and binding of extents 408 to spaces 406 may be achieved in various ways. FIGS. 8-10 present some alternative scenarios for achieving this binding. (Each of these figures presents the state of a storage device 102 at two time points, illustrated respectively as the left and right portions of the figure.) In the exemplary scenario 800 of FIG. 8, at a first time point 802, the storage device 102 comprises a pooled partition 502 storing a pool configuration 402 for a pool 404, as well as a record of the storage device 102 storing the pool 404, in addition to a large amount of available capacity 508. At a second time point 804, when a space allocation request 806 to generate a space 406 to store user data is received, the pool configuration 402 may be updated to add a record for the space 406, including its type and provisioned capacity. Additionally, at this second time point 804, two extents 408 may be created from the available capacity 508 of the pooled partition 502, and the pool configuration 402 may be updated to add records for the extents 408 that bind the extents 408 to logical locations of the space 406. In this manner, the extents 408 for a space 406 may be promptly allocated and available for use.

Alternatively, the binding of extents 408 for a space 406 may be delayed, and may be performed on a just-in-time basis. For example, as illustrated in the exemplary scenario 900 of FIG. 9, at a first time point 902, a space allocation request may be received to create a space 406, and a record for the space 406 may be created within the pool configuration 402. However, the capacity of the space 406 may not be fully allocated at the first time point 902; for example, at the first time point 902, only one extent 408 may be allocated, but other portions of the space 406 (e.g., other address blocks). However, at a second time point 904, when a request is received to write to a particular address of the space 406 for which an extent 408 has not yet been allocated, a second extent 408 may be allocated from the available capacity 508 of the pooled partition 502 and bound to the space 406 in the extent record 408 within the pool configuration 404. This delayed allocation may enable a faster fulfillment of the request to create the space 406 (since fewer than all extents 408 have to be allocated at the first time point 902), and/or may enable thin provisioning, wherein space 406 may be provisioned with a provisioned size that is greater than a sum of the extent sizes of the extents 408 bound to the space 406 and an available capacity 508 of the storage devices 102 sharing the pool 404.

FIG. 10 presents an illustration of an exemplary scenario 1000 comprising a further variation in the allocation of spaces 406, wherein the allocation of extents 408 for a space 406 may be separated from the binding of the extents 408 to particular logical locations of the space 406. In this exemplary scenario 1000, at a first time point 1002, the storage device 102 comprises a pooled partition 502 having a space 406 for which two extents 408 have been allocated. However, the extents 408 have not been mapped to particular logical locations within the space 406, but are simply reserved as available capacity for the space 406. This reservation may be performed, e.g., upon receiving the request to create the space 406, so that some capacity is reserved and available for use, even if less than all of the provisioned capacity of the space 406 is reserved and the addresses within which data is to be written to the space 406 are not yet known. Accordingly, at a second time point 1004, when a write request is received to write to a logical address in the space 406 for which an extent 408 has not yet been bound, one of the unbound extents 408 may be selected and bound to the location of the space 406 comprising the logical address specified in the write request. In this manner, the binding of spaces 406 to extents 408 may be deferred without compromising the availability of capacity for the space 406. In these and other ways, extents 408 may be allocated to spaces 406 to enable various features such as improved performance and thin provisioning. Those of ordinary skill in the art may devise many variations in the use of the pool configuration 408 while implementing the techniques presented herein.

D3. Pool Configuration Owner

A third aspect that may vary among embodiments of these techniques relates to the identification of a pool owner of the pool 404. For example, among the computers or other devices 710 having access to the storage devices 102 comprising a pool, a pool configuration owner may be elected that has exclusively write access among the computers to the pool configuration 402. Upon receiving a request to update the pool configuration 402 (e.g., a request to create a space 406 or bind an extent 408 to a space 406), a computer may determine whether it is the pool configuration owner, and if not, may forward the request to the pool configuration owner. Moreover, if the pool configuration owner becomes unresponsive or unavailable, then the other computers may, upon detecting the failure of the pool configuration owner, identify a substitute pool configuration owner among the computers (e.g., electing a new pool configuration owner). This election may enable updates to the pool configuration 402 to be performed in a manner that avoids conflicting updates arising from race conditions, which may leave the pool configuration 402 in an inconsistent state. Those of ordinary skill in the art may envision and utilize many variations may be identified in the manner of updating the pool configuration 402 to protect the integrity of the pool configuration 402 and the pool 404 from such conditions.

E. Computing Environment

Figure 11:
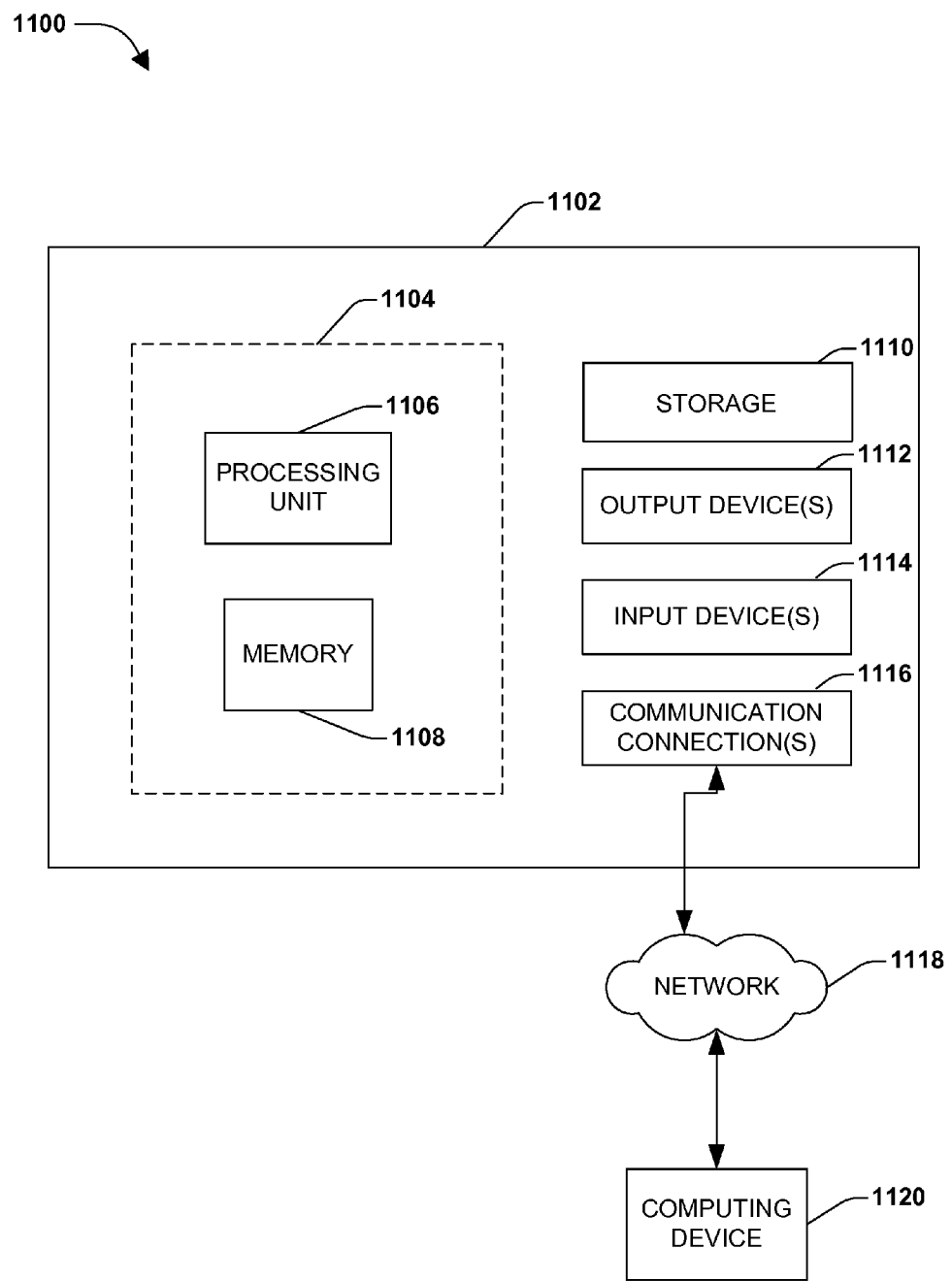
FIG. 11 illustrates an exemplary computing environment wherein one or more of the provisions set forth herein may be implemented.

FIG. 11 presents an illustration of an exemplary computing environment within a computing device 1102 wherein the techniques presented herein may be implemented. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, and distributed computing environments that include any of the above systems or devices.

FIG. 11 illustrates an example of a system 1100 comprising a computing device 1102 configured to implement one or more embodiments provided herein. In one configuration, the computing device 1102 includes at least one processor 1106 and at least one memory component 1108. Depending on the exact configuration and type of computing device, the memory component 1108 may be volatile (such as RAM, for example), non-volatile (such as ROM, flash memory, etc., for example) or an intermediate or hybrid type of memory component. This configuration is illustrated in FIG. 11 by dashed line 1104.

In some embodiments, device 1102 may include additional features and/or functionality. For example, device 1102 may include one or more additional storage components 1110, including, but not limited to, a hard disk drive, a solid-state storage device, and/or other removable or non-removable magnetic or optical media. In one embodiment, computer-readable and processor-executable instructions implementing one or more embodiments provided herein are stored in the storage component 1110. The storage component 1110 may also store other data objects, such as components of an operating system, executable binaries comprising one or more applications, programming libraries (e.g., application programming interfaces (APIs), media objects, and documentation. The computer-readable instructions may be loaded in the memory component 1108 for execution by the processor 1106.

The computing device 1102 may also include one or more communication components 1116 that allows the computing device 1102 to communicate with other devices. The one or more communication components 1116 may comprise (e.g.) a modem, a Network Interface Card (NIC), a radiofrequency transmitter/receiver, an infrared port, and a universal serial bus (USB) USB connection. Such communication components 1116 may comprise a wired connection (connecting to a network through a physical cord, cable, or wire) or a wireless connection (communicating wirelessly with a networking device, such as through visible light, infrared, or one or more radiofrequencies.

The computing device 1102 may include one or more input components 1114, such as keyboard, mouse, pen, voice input device, touch input device, infrared cameras, or video input devices, and/or one or more output components 1112, such as one or more displays, speakers, and printers. The input components 1114 and/or output components 1112 may be connected to the computing device 1102 via a wired connection, a wireless connection, or any combination thereof. In one embodiment, an input component 1114 or an output component 1112 from another computing device may be used as input components 1114 and/or output components 1112 for the computing device 1102.

The components of the computing device 1102 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of the computing device 1102 may be interconnected by a network. For example, the memory component 1108 may be comprised of multiple physical memory units located in different physical locations interconnected by a network.

Those skilled in the art will realize that storage devices utilized to store computer readable instructions may be distributed across a network. For example, a computing device 1120 accessible via a network 1118 may store computer readable instructions to implement one or more embodiments provided herein. The computing device 1102 may access the computing device 1120 and download a part or all of the computer readable instructions for execution. Alternatively, the computing device 1102 may download pieces of the computer readable instructions, as needed, or some instructions may be executed at the computing device 1102 and some at computing device 1120.

F. Usage of Terms

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method of organizing a storage set comprising at least two storage devices accessible on a computer having a processor, the method comprising:
   executing on the processor instructions configured to:
      within a storage region of at least two pooled storage devices, generate a pooled partition comprising a pool configuration stored within the pooled partition and identifying:
         the pooled storage devices storing the pooled partition, and
         at least one space providing logical storage capacity and represented within the pooled partition;
      present the logical storage capacity of the at least one space of the pooled partition, where at least one space is not initially associated with physical storage capacity of the at least two pooled storage devices; and
      responsive to receiving a request to reserve an amount of physical storage capacity to provide logical storage capacity for a selected space of the pooled partition, wherein the physical storage capacity of the selected space is less than the amount specified in the request:
         within the physical storage capacity of the at least two pooled storage devices that is not allocated for another space, allocate an extent providing physical storage capacity within the pooled partition; and
         update the pool configuration stored on the at least two pooled storage devices to associate the extent with the space to expand the physical storage capacity of the extent to satisfy the amount of physical storage capacity specified in the request.

2. The method of claim 1, a first storage device comprising a pooled partition spanning at least two partitions on the first storage device.

3. The method of claim 1, at least one space bound to:
   at least two extents stored in the pooled partition on a first storage device; and
   at least one extent stored in the pooled partition on a second storage device.

4. The method of claim 1, the storage region of a first storage device comprising:
   a first pooled partition associated with a first pool shared with a second storage device and not a third storage device; and
   a second pooled partition associated with a second pool shared with the third storage device and not the second storage device.

5. The method of claim 1, the pool configuration mirrored on the storage devices storing the pooled partition.

6. The method of claim 1:
respective storage devices storing a partition table specifying, for respective partitions within the storage region of the storage device, a partition type identifier of the partition; and
the pooled partition specified in the partition table as a pooled partition type identifier.

7. The method of claim 1, the pool configuration configured to specify extents as a logical area of a space and a physical area of a storage device.

8. The method of claim 7, the instructions configured to, upon receiving a request to allocate capacity to a space within the pool:
allocate an extent within the pooled partition;
bind the extent to the space; and
update the pool configuration to identify the extent and the space.

9. The method of claim 8, binding the extent to the space comprising:
upon receiving request to create a space, creating the space; and
upon receiving a write request to write to a location in the space, allocating the extent within the pooled partition.

10. The method of claim 8, binding the extent to the space comprising:
at a first time, allocating the extent to the space; and
upon receiving a write request to write to a location in the space, mapping the extent to a logical area within the space including the location of the write request.

11. The method of claim 8:
the pooled partition identifying a provisioned size for respective spaces;
respective extents having an extent size; and
at least one space having a provisioned size greater than a sum of the extent sizes of the extents bound to the space and an available capacity of the storage devices.

12. The method of claim 1:
the pool configuration specifying, for respective spaces, a space type identifier; and
at least one space comprising a journal and specified in the pool configuration as a journal space type identifier.

13. The method of claim 12:
at least one journal allocated to journal updates to a parent space; and
the pooled partition identifying the parent space of at least one journal.

14. The method of claim 1, the spaces comprising a maintenance space identifying, for respective spaces of the pooled partition, a status descriptor of the space.

15. The method of claim 14:
the pool configuration specifying, for respective spaces, a space type identifier; and
the maintenance space specified in the pool configuration as a maintenance space type identifier.

16. The method of claim 1:
at least one storage device of the storage set accessible by at least two computers; and
the instructions configured to identify, among the computers, a pool configuration owner having exclusive write access among the computers to the pool configuration.

17. The method of claim 16, the instructions configured to, upon receiving a request to update the pool configuration:
determine whether the computer is the pool configuration owner; and
upon determining that the computer is not the pool configuration owner, forward the request to the pool configuration owner.

18. The method of claim 17, the instructions configured to, upon detecting a failure of the pool configuration owner, identify a substitute pool configuration owner among the computers.

19. A system for organizing a storage set, the system comprising:
a partition manager configured to create a pooled partition having data that is distributed among at least two partitions of at least one storage device, the two partitions occupying less than all of the physical capacity of at least two storage devices, the pooled partition comprising:
extents that are located in the at least two partitions and including:
a first extent within a first subrange of the physical storage capacity of a first storage device of the storage set, and
a second extent within a second subrange of the physical storage capacity of a second storage device of the storage set, where the second storage device is different from the first storage device; and
configuration data stored within the pooled partition, the configuration data identifying the at least two storage devices comprising the pooled partition.

20. A storage device configured to provide physical storage capacity to logical storage capacity for at two spaces, the storage device comprising:
a partition comprising a range of physical storage capacity; and
a partition configuration stored within the partition and identifying:
a first extent comprising a first subrange of physical capacity within the partition that is allocated for logical storage capacity of a first space of the partition; and
a second extent comprising a second subrange within the partition that does not overlap the first subrange, and where the second extent providing physical storage capacity allocated for logical storage capacity of a second space that is different from the first space of the partition.

* * * * *